United States Patent [19]

Timmons et al.

[11] Patent Number: 4,849,128
[45] Date of Patent: Jul. 18, 1989

[54] PROCESS AND COMPOSITION FOR CONDITIONING AN AQUEOUS SYSTEM

[75] Inventors: Alban Timmons, North Humberside; Richard R. Davidson, Cambridge, both of England

[73] Assignee: Blue Circle Industries Limited, Great Britain

[21] Appl. No.: 604,449

[22] Filed: Apr. 30, 1984

Related U.S. Application Data

[63] Continuation of Ser. No. 360,061, Mar. 22, 1982, abandoned.

[30] Foreign Application Priority Data

Mar. 24, 1981 [GB] United Kingdom ................ 8109095

[51] Int. Cl.$^4$ ............................ C02F 5/10; B01F 3/00; B01J 13/00; B01D 21/00
[52] U.S. Cl. ...................................... 252/181; 210/702; 210/716; 210/725; 210/728; 210/734; 252/303
[58] Field of Search ............... 210/702, 725, 728, 734, 210/716; 252/303, 181

[56] References Cited

U.S. PATENT DOCUMENTS

| | | | |
|---|---|---|---|
| 2,941,942 | 6/1960 | Dahlstrom et al. | 210/725 |
| 3,549,527 | 12/1970 | Peck et al. | 210/734 X |
| 3,826,365 | 7/1974 | Mercade | 209/5 |
| 4,012,354 | 3/1977 | Paul | 524/376 |
| 4,108,768 | 8/1978 | Sebelik et al. | 210/725 X |
| 4,282,059 | 8/1981 | Davidson | 162/158 |

FOREIGN PATENT DOCUMENTS

| | | |
|---|---|---|
| 586506 | 3/1925 | France . |
| 1588016 | 7/1926 | United Kingdom . |
| 812228 | 4/1956 | United Kingdom . |
| 816399 | 7/1957 | United Kingdom . |
| 901916 | 7/1962 | United Kingdom . |
| 1159819 | 7/1969 | United Kingdom . |
| 1510930 | 5/1978 | United Kingdom . |
| 2082941 | 3/1982 | United Kingdom . |

Primary Examiner—Mukund J. Shah
Attorney, Agent, or Firm—Brooks Haidt Haffner & Delahunty

[57] ABSTRACT

An aqueous composition for conditioning an aqueous system, for example a sewage slurry, comprises an alkaline earth metal hydroxide, e.g. lime, and an anionic oligomeric polyelectrolyte, e.g. a salt of polyacrylic acid which composition has at least 40% by weight of particulate solid materials. Other components may include a weighting agent, e.g. calcium carbonate, a cationic flocculant, e.g. a polyacrylamide, and a base such as sodium hydroxide.

17 Claims, No Drawings

PROCESS AND COMPOSITION FOR CONDITIONING AN AQUEOUS SYSTEM

This application is a continuation of application Ser. No. 360,061, filed Mar. 22, 1982, now abandoned.

FIELD OF THE INVENTION

The present invention relates to a process and a composition for conditioning an aqueous system, especially a system comprising water having matter suspended therein, for example sewage.

By "conditioning" is meant bringing about a change which aids separation of water and suspended matter, as in, for example, sedimentation or filter-pressing in wastewater or sewage treatment.

BACKGROUND OF THE INVENTION

Hydrated lime, hereinafter termed 'lime' (calcium hydroxide) in distinction from quicklime (calcium oxide), its industrial precursor, is traditionally used in wastewater conditioning. It is desirable to supply lime to the user in the form of an aqueous suspension, especially by means of a tanker filled and emptied by pumping. Hitherto it has hardly been possible to pump lime suspensions at solids contents above 35% by weight. This involves costs in transporting water which have in the past made such operations uneconomic.

In industrial practice it is known to treat aqueous particulate systems which polyelectrolytes in order to promote the flocculation of the particles. In the treatment of wastewater this enables clarification by sedimentation of the suspended matter to occur more rapidly and effectively than without the polyelectrolyte addition. In the treatment of wastewater these polyelectrolytes are often used in conjunction with a conditioning aid or destabiliser such as hydrated lime.

In wastewater treatment the use of cationic polyelectrolytes is now generally preferred, because they are directly substantive to organic suspended matter in most wastewaters in sewage, animal farm waste, papermaking effluent and many industrial effluents, suspended matter carries a negative charge and is thus best treated by cationic polyelectrolytes which carry a positive charge.

In the treatment of potable water, lime is used as a part of a lime or lime-soda water-softening process; polyelectrolyte may be added to accelerate the sedimentation of suspended organic or inorganic matter and of the calcium carbonate particles precipitated by interaction of the lime with the hardness of the water.

In the above processes concerned with wastewater treatment it is advantageous to add a weighting agent which, by increasing the specific gravity of the flocculated matter, increases the rate of sedimentation and thus the rate of clarification of the liquor.

In wastewater treatment it is customary to add conditioning aids, such as lime, and polyelectrolyte separately; weighting agents where used are also separately added.

In all industrial practice it is clearly desirable for additives, instead of being added batchwise or metered into a system separately, to be added together as one easily pumped and easily metered aqueous suspension containing all the ingredients. Duplication of pumps and metering equipment is thus avoided.

It would also be industrially convenient for such an additive to be manufactured at a central point such as the plant that manufactures one or more of the ingredients. This additive could then be transported, as a suspension, by tanker or other means to the user site. This would avoid the necessity for the user to employ plant for preparing aqueous suspensions or solutions of the various materials or chemicals. In particular it is unpleasant to prepare suspensions from dry lime because of dusting into the atmosphere of fine irritant particles. The preparation of solutions of polyelectrolytes is also not free from difficulty and is best carried out centrally with appropriate equipment.

For this operation to be commercially successful it would be necessary for the material carried by tanker to be of high solids content so as to minimise transport charges on water.

It is clearly of the greatest convenience to the user for a single additive suspension/solution to be supplied by road or rail tanker and cleanly pumped into a tank having simple facilities for avoiding sedimentation, e.g. by slow stirrer or bubble suspension.

In the treatment of sewage and the like, various types of apparatus are used for the settling and clarifying processes. The object of these processes is to enable particles in suspension in water, that is those particles already existing in the raw water and/or those resulting from the action of a chemical reagent (added to effect, for example, coagulation, removal of iron or chemical purification), to sink to the bottom. It is possible to couple a static settling tank to a flocculation unit in such processes. However, when the treatment comprises the addition of reagents, it can be an advantage to combine flocculation and clarification within a single unit, as this permits complete reaction to be obtained with the formation of dense precipitates. Sludge-blanket clarifiers are commonly used.

In French Patent Specification No. 586,506 (published 25 March 1925), it is disclosed that effluent water, such as sewage, may be treated with a small quantity (generally 0.05 to 0.5%) of lime to give flocculant precipitate that can be drained and then pressed to give a compact mass. An absorbent material, for example calcium carbonate, may be added to the lime.

Recently, P. Stead and B. Winfield, of Portsmouth Polytechnic, England, have developed a "once through" plant for the rapid sedimentation of primary sewage (i.e. sewage that has passed through grit tanks) using a treatment with lime and Zetag 92 (a cationic polyacrylamide from Allied Colloids Ltd., England). The treated sewage flocculates rapidly. In a correctly designed cone-shaped treatment tank with a central downcomer, a stable sludge blanket can be formed and the effluent from the system can be maintained at a turbidity of less than 30 nephelometric units; this is accompanied by a substantial reduction in organics, phosphates and the like.

The system developed by Stead and Winfield will be of particular advantage in areas where at present virtualy untreated sewage is pumped into the sea or into tidal estuaries. The plant should enable a massive reduction in pollution to be achieved at minimal cost. However, it would clearly be desirable to have available a single additive composition that could be employed as a "one shot" treatment in the "once through" plant.

It is known that sewage, particularly in hard water areas, has a lime demand (or lime charge); typically, the lime demand of sewage in a hard water area is in the range of 180 to 240 ppm. Reduction in the lime charge used for treatment of the sewage gives poor results, in particular poor clarification and failure to remove organic matter. The addition of calcium carbonate, alone or with a polyacrylamide, again is known to give poor results in the treatment of sewage.

When calcium carbonate is precipitated in sewage in situ, using hydrated lime, either from calcium bicarbonate naturally present in the water or from calcium bicarbonate that is produced by the addition of calcium chloride or sodium bicarbonate, poor flocs and a hazy supernatant liquor are formed. The cause of this is believed to be the rapid absorption of proteins by the calcium carbonate formed, this mechanism inhibiting crystal growth and floc formation.

As mentioned above, it is known to use lime and Zetag 92 for the treatment of sewage. However, it would clearly be desirable to improve yet further the rate of sedimentation and the strength of the resultant floc.

Any process which improves the rate of flocculation of suspended particles and increases their density and strength would be particularly applicable to processes of sludge blanket clarification.

It will be seen from the above discussion that there is a need for suspension of lime (or other alkaline earth metal hydroxide) of high solids content and which possesses a rheology that makes it suitable for tanker transport. In a number of applications it would be desirable for such a suspension also to contain a weighting agent and/or to be capable of accommodating a cationic flocculating agent of high molecular weight without unacceptable deterioration in the rheological properties of the suspension.

SUMMARY OF THE INVENTION

The present invention provides an aqueous composition for conditioning an aqueous system, which composition comprises (a) particles of an alkaline earth metal hydroxide, characterised in that the composition also contains (b) an anionic oligomeric polyelectrolyte.

As more fully described hereinafter, the composition may contain one or more components selected from (c) particulate weighting agents, (d) high molecular weight, cationic polyelectrolytes and (e) alkali metal, ammonium or quaternary ammonium hydroxides.

The present invention also provides a process for conditioning an aqueous system, which comprises the addition thereto of an alkaline earth metal hydroxide in the form of a composition according to this invention.

The present invention also provides a process for conditioning an aqueous system which comprises the addition thereto of an alkaline earth metal hydroxide and a weighting agent, characterised in that a high molecular weight cationic polyelectrolyte is also added to the said aqueous system.

PREFERRED EMBODIMENTS OF THE INVENTION

(I) Applications

The invention finds application in a number of fields. Potential uses of the suspensions of the invention clearly include any process which in the past has used lime in the form of a dry powder, since the serious disadvantages of this are avoided. Reference may be made to Robert S. Boynton, 'Chemistry and Technology of Limestone', 2nd Edition 1980, John Wiley, Chapter 11, 'Uses of Lime', particularly Table 11-1 'Lime and uses' on p. 384. It should be noted that in this Chapter the use of the term 'lime' includes quicklime used in metallurgy, and that 'lime' meaning hydrated lime, including the cases where this has been formed in situ from quicklime is the subject of the present invention. Other and novel uses may be envisaged.

The invention can be utilized to advantage in the treatment of wastewater. The active components can be formulated as an additive for the treatment of wastewater, which additive is fluid, pumpable, and suitable for supply by road or rail tanker. The invention can provide improved clarification, improved removal of dissolved, e.g. proteinaceous, matter, an increased sedimentation rate and increased density of the settled particulate matter.

The invention also permits a treatment of water, in particular potable water, in which treatment simultaneous softening (removal of calcium compounds, whether temporary or permanent hardness) and flocculation of suspended impurities take place, and in which there is a more rapid sedimentation of the precipitated or flocculated matter.

According to another aspect there is provided a process and a material for the treatment of animal farm waste, e.g. pig farm slurry.

The invention can, furthermore, be utilized in the treatment of effluents to remove heavy metal economically and effectively. The invention can also be utilized, together with the use of ferric chloride or the like, in the treatment of abbatoir wastes (saveall systems).

However, the invention finds particular application in the treatment of sewage, whether at the primary, secondary or tertiary stages. The invention can be used with any customary sewage-treatment plant; however, it is of particular advantage with the "once through" plant developed by Stead and Winfield, referred to above.

The compositions of the present invention can also be used to advantage in the hydrodynamic separation disclosed in United Kingdom Patent Specification No. 2,082,941A when used as a primary settlement facility for waste, e.g. sewage, containing colloidal organic matter.

The invention can also be used in the conditioning (including dewatering and separation) of sewage sludge.

As stated above, it is known that when calcium carbonate is precipitated in sewage in situ, there is an inhibition of crystal growth and of floc formation. However, when an insoluble carbonate is added as a weighting agent in accordance with the present invention, protein removal is still effectively maintained, but floc formation and sedimentation are improved.

Furthermore, it is known that a reduction in lime charge gives poor results in the treatment of sewage. However, in the practice of the present invention, it has been found that a quantity of lime can be added that is below the lime demand of the sewage whilst still obtaining excellent results. It therefore appears that the activity of both component (a) and component (c) is enhanced when these components are added simultaneously. The enhancement of activity is especially marked when these components are mixed together, in particular as an aqueous slurry, before addition of the system to be conditioned. This enhancement of activity is all the more surprising when one considers that the addition of calcium carbonate to sewage, either alone or in the presence of a polyacrylamide, is known to give very poor results.

(II) Components

The preferred compound for use as component (a) is hydrated lime, $Ca(OH)_2$. Of course, an aqueous suspension or slurry of particulate hydrated lime will generally contain some lime in solution in the interparticulate water.

The use of dolomitic lime (which includes magnesium compounds) or baryta ($Ba(OH)_2$) may be preferred on occasions.

The preferred anionic oligomeric polyelectrolytes for use as component (b) are of high charge density, e.g. polyacids and their salts. Particularly useful in the present invention as deflocculants are alkali metal salts of simple or complex oligomers of acrylic or methacrylic acid such as Dispex N40 (Allied Colloids Ltd., U.K.) or Orotan 850 (Rohm and Hass (U.K.) Ltd.). These are supplied as pourable solutions of 40% and 30% solids content respectively, this showing their oligomeric character. Low viscosity sodium carboxymethyl cellulose such as Courlose F20 G (British Celanese Ltd., U.K.), a solid product, and oligomeric sulphonates are also useful. Examples of such sulphonates are the naphthalene sulphonate/formaldehyde condensates (e.g. Dispersol T) and sulphonated melamine/formaldehyde resins (e.g. Melment); these may be used with nonionic surfactants (preferably of HLB of 10-15), if appropriate.

The preferred weighting agents to be used as optional component (c) are substantially water-insoluble carbonates. Calcium carbonate is especially preferred; this can be from a naturally occurring source, ground as appropriate, such as calcite, aragonite, limestone, coral or oyster shells, or may be from a synthetic source, for example precipitated chalk.

Alternatively, barium carbonate or strontium carbonate could be used. Although the present process is, in general, effective in the removal of mercaptans from an aqueous system, barium carbonate is also effective in the removal of sulphate (as in barium hydroxide). The removal of mercaptans is particularly important in the treatment of animal farm waste where the mercaptans can produce a most unpleasant odour.

Precipitated calcium carbonate can be prepared by the addition of calcium oxide and/or calcium hydroxide to water and treating the system with carbon dioxide. By stopping the reaction at an intermediate stage, one would obtain an aqueous slurry containing calcium hydroxide and calcium carbonate; this slurry can be used to provide components (a) and (c) for the practice of the present invention.

The weight ratio of component (a) to component (c) can be varied widely, depending upon the application; it may be, for example, from 1:19 to 19:1, preferably from 1:9 to 9:1. However, a ratio of from 2:3 to 3:2 can give particularly good results, a ratio of 1:1 being especially preferred.

Component (a) and component (c) are generally added at a combined dosage rate of from 20 to 1000 ppm, preferably 20 to 300 ppm, e.g. 50 to 300 ppm. Especially in the treatment of hard-water-borne sewage, a combined dosage rate of 150 to 250 ppm, in particular 200 ppm, has been found to be very effective.

The polyelectrolyte employed as optional component (d) will generally have a molecular weight of at least $1 \times 10^6$, preferably $6 \times 10^6$ and even as much as $15 \times 10^6$. The high molecular weight is reflected in the fact that the polyelectrolyte gives appreciable viscosity in aqueous solution at a concentration of only 0.1% by weight. Cationic polyacrylamides are preferred, e.g. Zeta 92 and Percol 292.

It is also practicable to supply the lime suspensions to e.g. a sewage treatment works without a content of such a bridge-flocculating polyelectrolyte, this being added either to the lime suspension at the treatment works or separately from the lime suspension to the sewage to be conditioned, as may be found best in practice at the particular site with the particular wastewater.

The cationic polyelectrolyte (which acts as a flocculant in the system to be conditioned) is generally used at a dosage rate of 0.01 ppm to 20 ppm, especially 0.05 ppm to 5 ppm.

Typically, the anionic oligomeric polyelectrolyte (b) will be present in the aqueous suspensions of this invention in an amount (as active material) of 0.1 to 5%, especially 0.5 to 2%, by weight of the alkaline earth metal hydroxide (a).

The preferred based for use as optional component (e) is an alkali metal hydroxide, expecially sodium hydroxide. The bases may be produced in situ from appropriate precursors such as carbonates or other salts of weak acids. Thus, for example, in the presence of lime, sodium carbonate, borate, aluminate or silicate will provide sodium ions and hydroxyl ions.

It will be understood, of course, that components (a), (b), (c), (d) and (e) may each be a mixture of two or more appropriate compounds.

(III) Suspensions of high solids content

In embodiments of the process wherein a weighting agent is used, it is desirable for this to be added simultaneously with the alkaline earth metal hydroxide to the aqueous system to be conditioned. It is particularly preferred that these components be premixed before the said addition in order to allow for maximum activation of these components. The cationic polyelectrolyte of high molecular weight can be added before or after the other components, but is preferably added simultaneously with the hydroxide and weighting agent. The addition of the said components in admixture, and in particular as a single slurry, is thus particularly convenient.

From the state of the art, it would not have been expected that one could prepare a suspension of, for example, lime, calcium carbonate and a macromolecular cationic polyelectrolyte as a suspension having an economically hgh content of solids. It would have been expected that the polyelectrolyte would flocculate the particles, resulting in a very great increase in viscosity and in at least a partial loss of the effectiveness of the polyelectrolyte in flocculating the suspended matter in the aqueous system to be conditioned.

However, it has now been discovered that the presence of an anionic oligomeric polyelectrolyte will permit the preparation not only of lime suspensions of high solids content (greater than 40% by weight and preferably 50% or higher) but also of reasonably stable suspensions of high solids content and containing the above-defined components (a) plus (c) and/or (d).

Thus, it has been surprisingly discovered that it is possible to add a solution of a macromolecular cationic polyelectrolyte to a particulate suspension of high solids content without the thickening consequent on flocculation. For optimum effect, it appears that the following three conditions should be met: (i) the solution of cationic polyelectrolyte is brought to an alkaline pH; (ii) there is present in solution in the water containing the dissolved cationic polyelectrolyte a sufficiency of ions of a divalent metal; and (iii) the suspended particles are deflocculated by an anionic oligomeric polyelectrolyte, the deflocculating activity of which is not eliminated by the divalent ions present.

It will therefore be seen that, in one aspect, the invention provides a suspension of mineral particles which are normally thickened, coagulated or flocculated by a content of dissolved polyelectrolyte but which are enabled to contain the said polyelectrolyte without the said thickening, coagulation or flocculation occurring.

The fact that the activity of a solution of a macromolecular cationic polyelectrolyte, which is normally a strong flocculant for suspended particles, can be inhibited under the above conditions, so that the polyelectrolyte solution can be added smoothly and without thickening to the particulate suspension, is most surprising. It is also surprising that the flocculating activity of the cationic polyelectrolyte is at least partially regained on dilution, particularly in hard water.

In order to achieve the high solids content suspensions which are preferred for the economic operation of the present invention, it is desirable for the mineral particles to be deflocculated by an anionic agent and subjected to high shear mixing before the addition of the solution of the inhibited cationic polyelectrolyte flocculant.

In the preferred embodiments, the particles will be calcareous in nature, for example hydrated lime and/or calcium carbonate. The divalent metal ions referred to above as being necessary for optimum effect are conveniently supplied by an alkaline earth metal hydroxide, preferably calcium hydroxide; this compound will also supply the hydroxyl anions necessary to achieve the alkaline pH, which is also stated above to be necessary for optimum effect.

It would have seemed unlikely or indeed impossible that the smooth products of this invention could be manufactured and if so would be useful in producing weighted flocs from particulate suspensions. It would have been expected that the polyelectrolyte would cause flocculation of the mineral particle suspensions and that these would in consequence be of low solids content, rough and inhomogeneous. It is believed that the good results derive from several interacting effects: (i) the hydroxyl ions present counteract and repress the cationic activity of the cationic flocculating polyelectrolyte; (ii) the divalent ions present cause the cationic polyelectrolyte to lose its extended molecular chain structure and to form coils which have a greatly decreased flocculating action; (iii) the divalent ions present repress the anionic activity of the anionic polyacid deflocculating agent which is so chosen that the formation of the calcium salts of these polyacids does not destroy the deflocculating action on the mineral particles in suspension; (iv) the reduction of the anionic activity of the anionic deflocculant and the reduction of the cationic activity of the cationic flocculant reduce the normal anionic/cationic interaction which normally causes great viscosity increase, gelation, and inhomogeneity.

It might also have been expected that interaction between the calcium ions and the anionic and the cationic materials present would destroy the flocculating activity of the cationic material which it is desired to retain. It is believed that on dispersion into and great dilution in the particulate system to be treated and flocculated, especially when this is in hard water, the calcium salts of the anionic deflocculant dissolve separately from the molecules of the cationic flocculant. The hydroxyl ions which had been repressing the cationic activity of the cationic polyelectrolyte are neutralised by dilution and chemical reaction. the cationic activity of the cationic polyelectrolyte is thus restored. Diluation and (in hard water systems) reaction of calcium ions (the preferred divalent ions) with hardness in the water reduces their concentration in solution. The cationic polymer molecules are thus enabled to expand and so regain their full flocculating activity.

The practice of the invention described in this specification does not however depend upon the correctness of the above interpretation of the experimental results. It is not intended that any theoretical explanation given herein should in any way limit the scope of the invention.

Over a period of time, the anionically deflocculated lime suspensions of this invention may exhibit thickening which, of course, reduces the ease with which they can be pumped. However, it has surprisingly been discovered that the presence of a base, as defined above for component (e), can reduce the rate of increase in viscosity; it can also increase the resistance to the formation of a hard sediment. The use of sodium hydroxide is particularly effective when component (b) is a sodium salt of an oligomer of acrylic acid.

Vigorous shear mixing is also advantageous to the production of lime-containing suspensions of high solids content. Particle simplification (dispersion) may also be useful in given low void volume as well as suspensions of high solids content; this must be done mechanically by application of shear-energy causing inter-particle friction and attrition. Particle smashing, e.g. by a ball-mill, is not very effective. Heavy duty paste mixers (putty mixers), rotor-stator (Kady type) mills, high speed dispersers with saw-toothed impellers (Cowles dissolvers) or sand grinders are suitable.

The invention is illustrated in and by the following Examples.

EXAMPLE I

Solids Content Of Lime Suspensions

R. S. Boynton (op. cit.) states (p. 328) of lime slurry: "This colloidal suspension form of hydrate has the consistency of thick cream. It will flow and is pumpable, like viscous liquid. It contains 60–73% of free water." This corresponds to a solids content of 40–27%. The following Table gives the solids contents of laboratory samples in deionised water deemed to have a pumpable consistency. The lime used was Hydralime (Blue Circle Industries Limited (U.K.), Industrial Minerals Division). The figures are percentages m/m on the suspension.

TABLE 1

| Sample | Lime | Calcium Carbonate | Sodium Hydroxide | Anionic Oligoelectrolyte |
| --- | --- | --- | --- | --- |
| 1 | 35 | — | — | — |
| 2 | 22.5 | 23.8 | — | — |
| 3 | 23.7 | 23.8 | — | — |
| 4 | 50 | — | — | 1.0 |
| 5 | 52.5 | — | 1.25 | 1.0 |

TABLE 1-continued

| Sample | Lime | Calcium Carbonate | Sodium Hydroxide | Anionic Oligoelectrolyte |
|---|---|---|---|---|
| 6 | 31.1 | 31.2 | 0.3 | 0.53 |

Notes
1. The calcium carbonate in Sample 2 was Snowcal 8SW; that in Samples 3 and 6 was Snowcal 3ML. Snowcal 8SW is a natural whiting of soft chalk origin and Snowcal 3ML derives from hard chalk. Both are products of Blue Circle Industrial Minerals Division.
2. The anionic oligoelectrolyte in Samples 4 and 5 was Dispex N40; that in Sample 6 was Orotan 850.
3. Mixtures of lime and calcium carbonate particles are effective in wastewater conditioning. The increase in the solids contents of the suspensions with 50% each of lime and carbonate is clear from Table 1. The effectiveness in thinning the suspensions of a content of an anionic oligoelectrolyte is also shown.

EXAMPLE II

Hydration Of Quicklime In The Presence Of Calcium Carbonate And Acceptance Of Polyelectrolytes The following were mixed together with slow laboratory stirring:

| | |
|---|---|
| Deionised water | 125 g |
| Snowcal 3ML whiting (Blue Circle Industrial Minerals Division) | 100 g |
| Ground quicklime A (Stavely Lime Products Ltd.) | 75 g |

Initially this was a limpid suspension. As the quicklime became hydrated the temperature rose during 2 hours from 20° C. to 40° C. while the suspension thickened and became a paste so that the stirrer became ineffective. The following additions were then made, in order:

| | |
|---|---|
| 10% w/w solution of sodium hydroxide in deionised water | 20 g |
| | 3 g |
| Dispex N40 (Allied Colloids Ltd., U.K.) | 323 g |

The product (Sample 7) immediately became fluid so that it could be noisily shaken by hand in a small pot. This property was retained for 3 weeks. The sediment was easily re-incorporated by shaking. The solids content was 62%, as calcium carbonate and lime. The product accepted without flocculation admixture of the cationic polyacrylamide macroelectrolyte Zetag 92 (Allied Colloids Ltd.)

The lime suspensions showed flocculation on dilution in hard tapwater and less on dilution in deionised water. This flocculation and co-flocculation with an anionic suspension of, e.g., china clay were however much strengthened by a content of cationic macroelectrolyte such as Zetag 92.

It can be advantageous to prepare the hydroxide (a) by hydration of the corresponding oxide during the process of manufacturing the suspension, conveniently in the presence of other mineral particles (the weighting agent).

EXAMPLE III

Suspension Of Hydrated Lime Containing Anionic Dispersant And Cationic Flocculant

| | Parts w/w |
|---|---|
| Deionised water | 100.0 |
| Dispex N40 | 3.0 |
| Hydralime | 100.0 |

The Hydralime was added to the mixed water and deflocculant with mechanical stirring. A flowy mix showing rheological dilatancy resulted.

To this was added 0.5 g of Zetag 92 as dry granular particles using mechanical stirring. The mix was then left to stand for 30 mins and was again mechanically stirred. It was a smooth product; the addition of the Zetag 92 produced little viscosity increases. Some dilution would be required for pumping.

On adding to hard tapwater, there was excellent formation of flocs and a clear supernatant liquid developed.

EXAMPLE IV

Suspension Of Chalk Whiting And Lime

A suspension was prepared according to the following formula:

| | Parts w/w |
|---|---|
| Calcium carbonate (Snowcal 6ML) | 25.3 |
| Hydralime | 25.3 |
| Dispex N40 | 1.0 |
| Deionised water | 28.3 |
| 0.4% Zetag 92/Deionised water | 20.1 |
| | 100.0 |

This was a thin pumpable product with resistance to sedimentation. It gave excellent flocs in hard tapwater.

EXAMPLE V

Demonstration Of The Value Of Lime, Calcium Carbonate And Cationic Polyelectrolyte Flocculant In Sewage Treatment A series of tests were effected in order to compare the effect on priamary sewage of a treatment with hydrated lime and Zetag 92 with a treatment employing a hydrated lime and calcium carbonate mixture and Zetag 92.

It is extremely difficult to use fully built slurries as a basis for laboratory jar tests since it is essential to dilute the slurries from 70% down to 1% in order accurately to dispense them into the test solutions. When active slurries are diluted flocculation will occur and thus some of the effectiveness of such a slurry is lost before it has the time to react with the sewage constituents. (Here, it should be remarked that in full scale operations, the ready reactivity of the slurry is a great advantage.) To avoid problems with premature flocculation, the hydrated lime and calcium carbonate were prepared as separate suspensions at a concentration of approximately 1% w/w. The required volumes of hydrated lime and calcium carbonate suspensions were pipetted into small beakers and mixed before addition to the sewage samples. After rapid mixing-in of the lime/carbonate mixture, the Zetag 92 was added with more rapid stirring for 30–60 seconds. The stirrer speed was then reduced to gentle agitation so that the floc formation could be observed. After 10 minutes the stirrers were stopped and the sample was allowed to settle for 5 minutes. Turbidity and pH readings were then taken.

The following observations, inter alia, were made:

(i) The mixture of hydrated lime, calcium carbonate and Zetag 92 gave excellent flocs, rapid settlement and a clear supernatant liquor. This mixture gave better results than the comparison hydrated lime/Zetag 92 mixture, in that the resultant sludge settled more rapidly and appeared to be stronger and more readily dewaterable than the sludge produced by the lime/Zetag 92 mixture.

(ii) The lime/carbonate/Zetag 92 mixture gave a supernatant liquor having a slightly lower pH than that produced by the comparison lime/Zetag 92 mixture.

(iii) The optimum weight ratio of lime to carbonate in the compositions of the present invention was about 1:1. The lime/carbonate/Zetag 92 mixture of the present invention gave good results at dosage rates ranging from 150 ppm to 250 ppm.

(iv) The presence of Dispex N40 as a deflocculant/dispersing agent in the slurries of the present invention gave no observable reduction in the effectiveness of the slurry.

The experimental results demonstrate that the lime/carbonate/Zetag 92 treatment, which is in accordance with the present invention, compares favourably with the treatment with lime and Zetag 92 alone. Furthermore, the mixture according to the present invention permits a considerable variation in dosage level to be tolerated without marked deterioration in the efficiency. The compositions of the present invention clearly offer increased economy and allow costs of storage and dispensing equipment to be considerably reduced and will, in addition, simplify the overall treatment of the system to be conditioned.

The experimental data are shown in the following tables, in which:

Table 1 summarizes a comparison of the known lime/Zetag treatment with a calcium carbonate/Zetag 92 treatment and with the lime/calcium carbonate/Zetag 92 treatment of this invention;

Table 2 shows the effect of varying the dose of a 50/50 mixture of lime/carbonate and a 40/60 mixture of lime/carbonate;

Table 3 shows the effect of omitting the Dispex N40 using a 50/50 mixture of lime/carbonate; and Table 4 shows the effect of using Empycryl (Albright & Wilson) as a dispersant with a 50/50 mixture of lime/carbonate.

TABLE 1

| TEST NO. | HYDRATED LIME (p.p.m.) | CALCIUM CARBONATE 6ML (p.p.m.) | FLOC RATING | SUPERNATANT LIQUOR | |
|---|---|---|---|---|---|
| | | | | pH | TURBIDITY |
| 1 | 200 | NIL | 6 | 9.35 | 12 |
| 2 | 180 | 20 | 5 | 9.4 | 12 |
| 3 | 160 | 40 | 5 | 9.35 | 13 |
| 4 | 140 | 60 | 4 | 9.2 | 14 |
| 5 | 120 | 80 | 4 | 9.1 | 14 |
| 6 | 100 | 100 | 6 | 9.0 | 13 |
| 7 | 100 | 100 | 6 | 8.9 | 15 |
| 8 | 80 | 120 | 5 | 8.8 | 15 |
| 9 | 60 | 140 | 4 | 8.7 | 20 |
| 10 | 40 | 160 | 3 | 8.45 | 25 |
| 11 | 20 | 180 | 2 | 8.2 | 44 |
| 12 | NIL | 200 | 1 | 7.7 | 82 |

TABLE 2

| TEST NO. | HYDRATED LIME (p.p.m.) | CALCIUM CARBONATE 6ML (p.p.m.) | FLOC RATING | SUPERNATANT LIQUOR | |
|---|---|---|---|---|---|
| | | | | pH | TURBIDITY |
| 13 | 125 | 125 | 6 | 9.05 | 12 |
| 14 | 100 | 100 | 6 | 8.95 | 16 |
| 15 | 75 | 75 | 5 | 8.8 | 19 |
| 16 | 100 | 150 | 6 | 8.9 | 14 |
| 17 | 80 | 120 | 6 | 8.8 | 15 |
| 18 | 60 | 90 | 4 | 8.65 | 19 |
| Table 3 | | | | | |
| 19 | 125 | 125 | 6 | 9.0 | 14 |
| 20 | 100 | 100 | 5 | 8.9 | 14 |
| 21 | 75 | 75 | 5 | 8.75 | 15 |
| Table 4 | | | | | |
| 22 | 125 | 125 | 1 | | 80+ |
| 23 | 100 | 100 | 1 | | 80+ |
| 24 | 75 | 75 | 1 | | 80+ |

Notes:
1. In all tests the lime/calcium carbonate suspensions were mixed together before application. The Zetag 92 was applied last after the lime or lime/carbonate had been mixed with the sewage sample.
2. The calcium carbonate suspension in Tests 1–18 contained 0.2% Dispex N40 w/w in the weight of calcium carbonate.
3. In all tests the charge of Zetag 92 was 0.4 ppm.
4. The "Floc Rating" was on a scale from 1 (poor) to 6 (good). A rating of 2 was considered "poor" whereas a rating of 3–5 was considered "fair".
5. The turbidity of the supernatant liquor is given in nephelometric units and was measured, as was the pH, 5 minutes after the treatment.

EXAMPLE VI

Use of lime suspensions for sewage treatment

A series of laboratory jar flocculation tests was carried out in order to compare the effects on a primary sewage of suspensions according to the invention and of the components added as suspensions prepared directly from the dry powders. Fresh raw comminuted sewage was obtained from the Water Research Association, Stevenage, U.K., and tests were carried out using a 6-jar standard laboratory flocculator with stirrers operating at the same speed in each jar containing 500 ml of sewage. The tests were carried out by adding the conditioners or flocculants to different jars, running the stirrers at high speed for 1 minute and then at slow speed for 10 minutes. After stopping, the formation of flocs, the rate of sedimentation and the clarity of the supernatant liquid were observed.

The dose of Hydralime and of polyelectrolyte (Zetag 92) to give the best clarification of the sewage were first determined in order to provide a standard. This was determined as 200 mg/l of lime or 125 mg/l of lime, and 125 mg/l of Snowcal 3 ML and 0.4 mg/l of Zetag 92. The equivalent proportions of lime and Snowcal were then added as a 62% suspension (Sample 7 of Example II) and equivalent lime was added as a 52.5% solids content lime suspension (Sample 5 of Example I). Floc formation, floc settlement and supernatant liquor clarity were similar to the standard in both cases.

It thus appeared that the content of Dispex N40 and of sodium hydroxide in the suspensions of the invention investigated did not interfere with the clarification of the sewage so that the advantages of supply of lime as suspensions of increased solids content could be gained without disadvantage.

EXAMPLE VII

Indicating The Value Of An Addition Of Sodium Hydroxide In Improving Stability

Example IV showed slow thickening on storage, and after 3 months had gelled. To this gelled sample was added 0.1 g of solid sodium hydroxide; the sample was then mechanically stirred at high speed by a laboratory propeller stirrer when it thinned down completely. This sample did not gel again after 7 months storage.

EXAMPLE VIII

Suspension Of Lime And Whiting, Showing The Advantage In Improved Stability Of An Addition Of Alkali With Anionic Defflocculant, And Of Energetic Mixing

|   |   | g. |
|---|---|---|
| (1) | Tapwater (Hardness 240 ppm as CaCo3) | 120.0 |
| (2) | Soda Ash (Anhydrous Sodium Carbonate) | 1.0 |
| (3) | Dispex N40 | 2.0 |
| (4) | Snowcal 6ML | 100.0 |
| (5) | Hydralime | 100.0 |
|   | Solids content 62.5% | 323.0 |

The procedure for preparation was found to be most important. Components (2) and (3) were dissolved in (1) and stirred in a beaker by a laboratory rotor-stator mixer (Intern. Laborat Appl. GmbH, Dottingen, X1020). It took about 10 minutes to introduce all the powder since the X1020 provides shear but poor circulation. The temperature rose by 12° C. during 5 minutes shear-mixing at the top solids content. Without this energy input the high solids content could not so readily be obtained.

The consistency was flowing/thixotropic. After a fortnight, slight bulk sedimentation had occurred giving a cloudy supernatant liquid. Stirring was easy save for a thin deposit, at the bottom, of lumpy particles, possibly from the lime. Little thickening had occurred, and the stirred product appeared of a pumpable consistency.

The lime/whiting suspension accepted an addition of Zetag 92 without flocculation occuring.

EXAMPLE IX

Hydrated Lime Suspension Using Caustic Soda With Anionic Defflocculant

|   |   | g |
|---|---|---|
| (1) | Hydrated lime | 200 |
| (2) | 10% Caustic Soda solution | 50 |
| (3) | Tapwater | 77 |
| (4) | Dispex N40 | 6 |
|   | Solids content 62% | 333 |

The components (1) and (2) were mixed to a 'crumble' by hand. This was added with relative ease to a mixture of components (3) and (4) while rotor-stator disperser X1020 was in operation. This took 4 minutes. A further 10 minutes of mixing gave a temperature rise of 13° C. Consistency appeared good.

After 1 week there was no sedimentation and no noticeable thickening had occurred: the consistency appeared excellent.

We claim:

1. An aqueous composition for conditioning an aqueous system, which composition comprises, a suspension of greater than 40% by weight of the composition of particulate solids selected from the group consisting of (1) alkaline earth metal hydroxide particles, and (2) a mixture of alkaline earth metal hydroxide particles and particles of a weighting agent in a weight ratio of at least 2:3, and the composition contains, as a defflocculant for the said solid particles, an anionic oligomeric polyelectrolyte.

2. A composition according to claim 1, wherein the particulate alkaline earth metal hydroxide contains hydrated lime, dolomitic lime, or baryta.

3. A composition according to claim 1, characterised in that the alkaline earth metal hydroxide is calcium hydroxide.

4. A composition according to claim 1 or 2, characterised in that the anionic polyelectrolyte is selected from anionic polyacids and salts thereof.

5. A composition according to claim 1 or 2, characterised in that the anionic polyelectrolyte is selected from the group consisting of the alkali metal salts of simple oligomers and complex oligomers of acrylic or methacrylic acid, low-viscosity sodium carboxymethyl cellulose, and oligomeric sulphonates.

6. A composition according to claim 1, characterised in that it contains, as a weighting agent, particulate calcium carbonate.

7. A composition according to claim 1 or 3, characterised in that it contains a mixture of alkaline earth metal hydroxide and weighting agent in a weight ratio of 1 to 1.

8. A composition according to claim 1 or 2, characterised in that it contains a mixture of alkaline earth metal hydroxide and weighting agent in a weight ratio of from 2:3 to 3:2.

9. A composition according to claim 1, characterised in that it also contains a high-molecular-weight, cationic polyelectrolyte.

10. A composition according to claim 9, characterised in that the cationic polyelectrolyte is a polyacrylamide.

11. A composition according to claim 10, characterised in that it contains (a) particulate calcium hydroxide, (b) a sodium salt of polyacrylic acid and (c) particulate calcium carbonate.

12. A composition according to claim 1 or 9, characterised in that it also contains, in solution, a base selected from alkali metal, ammonium and quaternary ammonium hydroxides.

13. A composition according to claim 12, characterised in that the base is formed in situ.

14. A composition according to claim 12, characterised in that the base is sodium hydroxide.

15. A process for conditioning an aqueous system that comprises water having matter suspended therein, which process comprises adding the composition of claim 1, claim 6 or claim 10, as such or after dilution, to said aqueous system.

16. A process according to claim 15, characterised in that an alkaline earth metal hydroxide and a weighting agent are added to the aqueous system to be conditioned at a combined dosage rate of 20 ppm to 1000 ppm.

17. A process according to claim 15, characterised in that the aqueous system to be conditioned comprises sewage.

* * * * *